United States Patent
Denoue et al.

(10) Patent No.: US 8,261,200 B2
(45) Date of Patent: Sep. 4, 2012

(54) INCREASING RETRIEVAL PERFORMANCE OF IMAGES BY PROVIDING RELEVANCE FEEDBACK ON WORD IMAGES CONTAINED IN THE IMAGES

(75) Inventors: Laurent Denoue, Palo Alto, CA (US);
John E. Adcock, Menlo Park, CA (US);
David M. Hilbert, Palo Alto, CA (US);
Daniel Billsus, San Francisco, CA (US)

(73) Assignee: Fuji Xerox Co., Ltd. (JP)

(*) Notice: Subject to any disclaimer, the term of this patent is extended or adjusted under 35 U.S.C. 154(b) by 976 days.

(21) Appl. No.: 11/740,840

(22) Filed: Apr. 26, 2007

(65) Prior Publication Data
US 2008/0267503 A1 Oct. 30, 2008

(51) Int. Cl.
*G06F 3/48* (2006.01)
*G06K 9/34* (2006.01)
*G06K 9/00* (2006.01)
*G06K 9/46* (2006.01)

(52) U.S. Cl. ........ 715/764; 382/181; 382/229; 382/177; 382/190; 707/1; 707/3; 707/6; 707/E17.019; 707/E17.02; 707/E17.022; 707/E17.001; 707/E17.008; 707/102; 707/E17.61; 707/E17.082; 715/200

(58) Field of Classification Search ................ 707/1, 3, 707/6, E17.019, E17.02, E17.022, 5, E17.001, 707/E17.008, 102, E17.041, E17.61, E17.082; 382/181, 229, 190; 715/764, 200
See application file for complete search history.

(56) References Cited

U.S. PATENT DOCUMENTS

| | | | | |
|---|---|---|---|---|
| 5,109,439 A * | 4/1992 | Froessl | | 382/305 |
| 5,408,540 A * | 4/1995 | Zlotnick | | 382/296 |
| 5,444,840 A * | 8/1995 | Froessl | | 1/1 |
| 5,553,224 A * | 9/1996 | Saund et al. | | 345/619 |
| 5,689,585 A * | 11/1997 | Bloomberg et al. | | 382/229 |
| 5,717,914 A * | 2/1998 | Husick et al. | | 1/1 |
| 5,825,919 A * | 10/1998 | Bloomberg et al. | | 382/177 |
| 5,875,263 A * | 2/1999 | Froessl | | 382/181 |
| 5,926,565 A * | 7/1999 | Froessl | | 382/181 |
| 6,023,528 A * | 2/2000 | Froessl | | 382/181 |
| 6,137,906 A * | 10/2000 | Dionne | | 382/176 |
| 6,249,604 B1* | 6/2001 | Huttenlocher et al. | | 382/174 |
| 6,424,743 B1* | 7/2002 | Ebrahimi | | 382/189 |
| 6,839,701 B1* | 1/2005 | Baer et al. | | 1/1 |

(Continued)

OTHER PUBLICATIONS

Hilbert et al., Seamless presentation capture, indexing, and management. Oct. 26, 2005. 9 pages.*

(Continued)

*Primary Examiner* — Boris Pesin
*Assistant Examiner* — Ece Hur
(74) *Attorney, Agent, or Firm* — Fliesler Meyer LLP

(57) ABSTRACT

An interactive system provides for increasing retrieval performance of images depicting text by allowing users to provide relevance feedback on words contained in the images. The system includes a user interface through which the user queries the system with query terms for images contained in the system. Word image suggestions are displayed to the user through the user interface, where each word image suggestion contains the same or slightly variant text as recognized from the word image by the system than the particular query terms. Word image suggestions can be included in the system by the user to increase system recall of images for the one or more query terms and can be excluded from the system by the user to increase precision of image retrieval results for particular query terms.

26 Claims, 7 Drawing Sheets

U.S. PATENT DOCUMENTS

| | | | |
|---|---|---|---|
| 7,072,889 B2* | 7/2006 | Ogawa | 707/742 |
| 7,430,566 B2* | 9/2008 | Li et al. | 1/1 |
| 7,555,165 B2* | 6/2009 | Luo et al. | 382/224 |
| 7,945,576 B2* | 5/2011 | Brown et al. | 707/769 |
| 8,014,603 B2* | 9/2011 | Rodriguez Serrano et al. | 382/177 |
| 2001/0051965 A1* | 12/2001 | Guillevic et al. | 707/532 |
| 2003/0033297 A1* | 2/2003 | Ogawa | 707/3 |
| 2004/0186827 A1* | 9/2004 | Anick et al. | 707/3 |
| 2005/0065916 A1* | 3/2005 | Ge et al. | 707/3 |
| 2007/0250501 A1* | 10/2007 | Grubb et al. | 707/5 |
| 2008/0304743 A1* | 12/2008 | Tang et al. | 382/173 |
| 2010/0008581 A1* | 1/2010 | Bressan | 382/177 |
| 2010/0067793 A1* | 3/2010 | Serrano et al. | 382/179 |
| 2010/0076999 A1* | 3/2010 | Okazaki et al. | 707/772 |
| 2011/0078191 A1* | 3/2011 | Ragnet et al. | 707/780 |
| 2011/0182513 A1* | 7/2011 | Eshghi et al. | 382/177 |
| 2011/0280447 A1* | 11/2011 | Conwell | 382/103 |

OTHER PUBLICATIONS

Doermann, David, "The Indexing and Retrieval of Document Images: A Survey," Technical Report: LAMP-TR-013/CFAR-TR-878/CS-TR-3876, University of Maryland, College Park, USA, 39 pages (Feb. 1998).

Hong, Tao, et al., "Improving OCR Performance with Word Image Equivalence," Fourth Symposium on Document Analysis and Information Retrieval, Las Vegas, NV, USA, Apr. 24-26, 1995, 21 pages (Apr. 1995).

Kolak, Okan, et al., "OCR Error Correction Using a Noisy Channel Model," Human Language Technology Conference, HLT 2002, San Diego, CA, USA, 6 pages (2002).

Taghva, Kazem, et al., "Hairetes: A Search Engine for OCR Documents," Proceedings of the 5$^{th}$ International Workshop on Document Analysis Systems V, 2002, 10 pages (Jan. 10, 2002).

Taghva, Kazem, et al., "Post-Editing Through Approximation and Global Correction," International Journal of Pattern Recognition and Artificial Intelligence, 1995, 12 pages (Mar. 1993).

Beitzel, Steven M., et al., "A Survey of Retrieval Strategies for OCR Text Collections," Symposium on Document Image Understanding Technology (SDIUT), 2003, 7 pages.

Callan, Jaime, et al., "Information Retrieval and OCR: From Converting Content to Grasping Meaning", Aug. 2002, 4 pages, SIGIR 2002 Workshops.

Denoue, Laurent, et al., "Projector Box: Seamless Presentation Capture for Classrooms," 6 pages.

Doermann, David, "The Indexing and Retrieval of Document Images: A Survey," Technical Report: LAMP-TR-013/CFAR-TR-878/CS-TR-3876, Feb. 1998, 39 pages.

Hong, Tao, et al., "Improving OCR Performance with Word Image Equivalence," Fourth Symposium on Document Analysis and Information Retrieval, Apr. 1995, 21 pages.

Kantor, Paul B., et al., "Report on the TREC-5 Confusion Track," Proceeding of the Fifth Text Retrieval Conference TREC-5, NIST Special Publication 500-238, 1996, 10 pages.

Klein, S.T., et al., "A Voting System for Automatic OCR Correction," Aug. 2002, 19 pages, SIGIR 2002 Workshops.

Kolak, Okan, et al., "OCR Error Correction Using a Noisy Channel Model," Human Language Technology Conference, 2002, 6 pages.

ScanSoft OmniPage 15, "Users Guide," 2005, 94 pages.

Taghva, Kazem, et al., "An Expert System for Automatically Correcting OCR Output," Information Science Research Institute, 8 pages, Proceedings of the IS&T/SPIE 1994 International Symposium on Electronic Imaging Science and Technology.

Taghva, Kazem, et al., "Hairetes: A Search Engine for OCR Documents," Proceedings of the 5th International Workshop on Document Analysis Systems V, 2002, 10 pages.

Taghva, Kazem, et al., "Post-Editing Through Approximation and Global Correction," International Journal of Pattern Recognition and Artificial Intelligence, Mar. 1995, 12 pages.

* cited by examiner hubert(307) kimber(284) insert(148) robert(27) alpert(17) dogbert(17) hundert(12)
norbert(9) 1-filbert(8) filbert(8) ilbert(8) i.ilbert(8) herbert(8)dhiibert(5) albert(5)
hilberts(4) jiilbert(4) lippert(4) hnbert(3) fibers(3) ollelt(3) 1-lilbert(3) hdiberg(3)
hilary(3) wolpert(3) ibert(2) hiibert(2) hlbert(2) hllbert(2) jhiibet(1) lhiptert(1) tilburg(1)
hilberfs(1) julbert(1) calvert(1) gilbert(1) hilight(1) liberty(1) luilbert(1) wiberg(1)
hhbert(1) imberi(1) liilbert(1) webert(1) ililbert(1) oilbnr(1)ipsert(1) intert(1) hilbrt(1)
hekberg(1) 1isert(1) ililbert(1)hilbertto(1)

FIG. 3

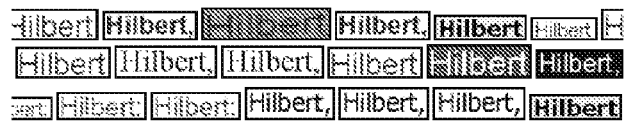

FIG. 4

| Term | Occurring on slide numbers |
|---|---|
| information (original term) | 7 |
| nformation | 1, 2, 5 |
| foriiation | 4, 6 |
| retrieval (original term) | 1 |
| retrlval | 2, 4, 8 |
| retrival | 3, 7 |

FIG. 13

| Slide Number | Contains variation of information | Contains variation of retrieval | Slides containing variations of all terms |
|---|---|---|---|
| 1 | x | x | x |
| 2 | x | x | x |
| 3 |   | x |   |
| 4 | x | x | x |
| 5 | x |   |   |
| 6 | x |   |   |
| 7 | x | x | x |
| 8 |   | x |   |

FIG. 14

INCREASING RETRIEVAL PERFORMANCE OF IMAGES BY PROVIDING RELEVANCE FEEDBACK ON WORD IMAGES CONTAINED IN THE IMAGES

BACKGROUND OF THE INVENTION

1. Field of the Invention

The present invention relates to increasing image retrieval performance of images by providing relevance feedback on word images contained in the images.

2. Description of the Related Art

In information retrieval systems where text is recovered from raster images through optical character recognition (OCR), errors in recognized text occur in even the most accurate systems. These errors will lower the effective retrieval performance of keyword searches. OCR is the machine recognition of printed characters. OCR is used, for example, in the banking industry to process checks and credit card slips. OCR systems can recognize many different OCR fonts, as well as typewriter and computer-printed characters. When text documents are scanned into a computer, they are "photographed" and stored as pictures in the computer. The pictures are raster images, which are a category of images into which all bitmapped images and video frames fall, such as GIF, JPEG, and MPEG images.

OCR software analyzes the light and dark areas of raster images in order to identify each alphabetic letter and numeric digit. When OCR software recognizes a character, it converts the character into an actual ASCII text character. This OCR conversion is performed because the actual text characters take up considerably less room on a computer disk than images.

Users can perform queries on OCR data to find and retrieve full page images of multi-page documents in which the query terms are located. Errors in the OCR data will lower the effective retrieval performance of keyword searches. Further, systematic errors in recognition exist when OCR software is used to search OCR text. For example, the name "Hilbert" is much more often misrecognized as "Hubert" instead of the correct "Hilbert." In this particular example, users would miss most of the relevant results.

There are numerous automatic approaches that can be used to improve search performance on imperfect OCR data, but they work best when queries are long, for example, five or more words, when documents are long for context and term redundancy, and when vocabularies are relatively static.

Some methods try to correct OCR errors before users issue queries. For example, voting-based methods use the majority of OCR results obtained from a number "n" different OCR systems to automatically decide the "right" spelling by outputting the text that results from the majority of the systems. These methods are based on the premise that different OCR systems tend to make different mistakes. Besides being "n" times slower, this method will not eliminate all errors because in some cases all OCR systems used produce the incorrect text for a given image.

Other methods assume the existence of a dictionary that is used to automatically correct words that are not found in the dictionary. For new words that are unlikely to be in any dictionary, these methods force these new words to become one of the words from the dictionary. By forcing these new words to become one of the words from the dictionary, these methods over-correct. In other words, if the OCR recognizes a word correctly, but this word is not in the dictionary, then the method will still change the word into one that is in the dictionary that is closest to the text produced by the OCR. Over-correction is undesirable, especially in the scientific domain where it is very likely that new terms are defined in slides, for example, project names, people's last names, and acronyms. Some methods also under-correct. For example, assuming that a word was correctly recognized simply because it was found in a dictionary is incorrect.

Yet other methods show that OCR data might in fact not significantly degrade the performance of information retrieval systems. Unfortunately, these results are only valid when the queries are long and the documents have hundreds or thousands of terms. Examples of long queries are Text Retrieval Conference (TREC) queries that have five or more terms.

Showing users the original image instead of the misrecognized text-based version is used in some OCR tools for manually correcting OCR errors in scanned documents. These systems, however, are used to proof a single term at a time and have not been designed in a document retrieval setting, and in particular, for document retrieval settings where users are presented with many terms.

What is needed is an interactive solution for increasing retrieval performance of images that works well when queries are short, for example one to two words, when documents are short with little context and term redundancy, and when vocabularies are relatively dynamic. It would be further desirable to create a user interface for increasing retrieval performance by allowing users to provide relevance feedback on word images.

SUMMARY OF THE INVENTION

An interactive system provides for increasing retrieval performance of images depicting text by allowing users to provide relevance feedback on words contained in the images. The system includes a user interface through which the user queries the system with query terms for images contained in the system. Word image suggestions are displayed to the user through the user interface, where each word image suggestion contains the same or slightly variant text as recognized from the word image by the system than the particular query terms. Word image suggestions can be included in the system by the user to increase system recall of images for the one or more query terms and can be excluded from the system by the user to increase precision of image retrieval results for particular query terms.

BRIEF DESCRIPTION OF THE DRAWINGS

Preferred embodiment(s) of the present invention will be described in detail based on the following figures, wherein:

FIG. 3 shows example text suggestions as recognized by ProjectorBox OCR software from the example corpus of FIG. 1 for the query term "Hilbert," according to embodiments;

FIG. 4 shows example word image versions of some of the FIG. 3 text suggestions, according to embodiments;

FIG. 13 illustrates an example table showing for multiple query terms the slides in which they were found, according to embodiments;

FIG. 14 illustrates an example table showing for the multiple query terms of FIG. 13, which slides are eliminated from query results, according to embodiments.

DETAILED DESCRIPTION OF THE INVENTION

ProjectorBox

One example OCR device for which retrieval performance needs to be improved is a proprietary "ProjectorBox" system. The principles that apply to the ProjectorBox in the description below, however, can also apply to other types of OCR devices. The ProjectorBox was created to automatically capture lectures for students, instructors, and educational institutions. After capturing lectures, the ProjectorBox indexes and manages presentation multimedia. It operates continuously to record the red-green-blue (RGB) information sent from presentation devices, such as an instructor's laptop or display devices such as a projector, for example. The ProjectorBox system consists of two main components, the capture component and the server. The capture component seamlessly captures high-resolution slide images, text, and audio. In addition to the video and audio capture hardware, the capture component consists of a software application that periodically transmits data to the server for further analysis and storage. The capture component sends images to the server, and audio clips are recorded from an external microphone and stored on the server as a compressed MP3 file.

A web-based user interface on the server allows students to browse, search, replay, and export captured presentations. The ProjectorBox allows students to retrieve lectures based on content and access captured media non-linearly, as opposed to having to play through sequential video. Captured media is accessed non-linearly through the use of queries on the web-based user interface. As a result, OCR is applied to slide images to extract text and create a full-text index to enable searching and non-linear access by the students.

Figure 1:
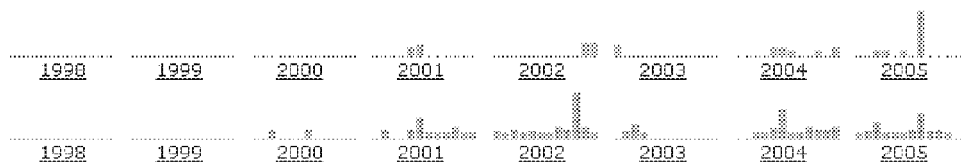
FIG. 1 illustrates example histograms of the number of slides that match "Hilbert" and "Hubert" for an example corpus of slides, according to embodiments.

FIG. 1 illustrates example histograms of the number of slides that match "Hilbert" and "Hubert" for an example corpus of slides, according to embodiments. The ProjectorBox has acquired and performed OCR on almost 200,000 images using OCR software. Systematic errors in recognition exist for OCR text from the ProjectorBox. The occurrence of terms as recognized by the ProjectorBox can be charted over time as a histogram. In the example of FIG. 3, the term "Hilbert" appears in many of the slides in the corpus of slides. The term "Hubert" does not appear in the slides, however. The top row of histograms shows the number of slides that the ProjectorBox correctly matched as "Hilbert." The bottom row of histograms shows the number of slides containing "Hilbert" that the ProjectorBox incorrectly matched as "Hubert." "Hilbert" is much more often misrecognized by the ProjectorBox software as "Hubert" (307 times) instead of the correct "Hilbert" (46 times). In this particular example, a user querying OCR data captured by the ProjectorBox with the query term "Hilbert" would miss most of the relevant results.

Figure 2:
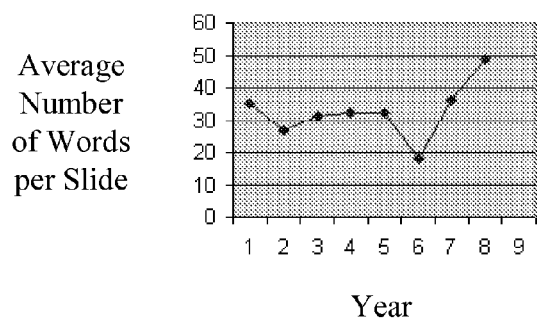
FIG. 2 illustrates on an example graph showing the average number of words on a slide per year for the FIG. 1 example corpus of slides used with the ProjectorBox for eight years, according to embodiments.

The material captured by the ProjectorBox system is different than that captured by the related art in several ways. First, most queries (89%) sent to ProjectorBox contain only one or two terms. Out of 3275 queries received by ProjectorBox in 2005, 1619 (49%) had one term (40%) had two terms. Second, the "documents" used with the ProjectorBox are very short because they are slides, such as slides used for Microsoft PowerPoint® presentations in classroom lectures. FIG. 2 illustrates on an example graph showing the average number of words on a slide per year for the FIG. 1 example corpus of slides used with the ProjectorBox for eight years, according to embodiments. The example corpus contains 50,917 slides. From the graph, it can be seen that the average number of words per slide is thirty-two. Third, terms routinely appear only once in a document. The lack of redundant terms in the slides means that for each term, the OCR is likely processing the term for the first time. Thus, this lack of term redundancy does not improve the effective OCR performance. Fourth, identical, or nearly identical, documents are common. This means that the size and position of text boxes within a slide can be used to associate recovered text boxes from multiple slides. The associated text boxes can be grouped together for presentation to the user who performed a query.

To improve image retrieval accuracy, query size matters because longer queries make it possible for the search engine to match documents in which one or more of the query terms can be found, even if not all terms in the query are found in a particular document. Query size is the number of terms in the query. Further, document size matters. If the user searches for "information," a long document is more likely to contain many instances of "information," and thus it is more likely that some of these instances are being correctly recognized.

In the case of the ProjectorBox, terms generally occur only once per document because slides are generally short documents. Thus, if a document contains just one instance of "information," the document will not be retrieved for the user if the only instance of "information" is misrecognized by the OCR software.

Display Word Images instead of Misrecognized Words

In order to correct the problem of misrecognized words in an image document by an OCR software, text converted from image documents run through the OCR software is first indexed using n-grams. An n-gram is a sub-sequence of a number "n" items from a given sequence of items. For example "a big cat" can be decomposed into the following ten bigrams, or "2-grams," for indexing: "_a", "a_", "_b", "bi", "ig", "g_", "_c", "ca", "at", and "t_", where "_" represents a word boundary. When a user performs a query for "a big cat," for example, n-gram indexing improves recall, meaning that n-gram indexing increases the number of correctly retrieved documents containing the query terms. For these same query terms, however, n-gram indexing also unfortunately lowers precision because n-gram indexing also increases the number of incorrectly retrieved documents. Again, the precision loss is not large if the query size, meaning the number of words in the query, is large enough. The larger the query size, the more evidence there is that the query succeeded in retrieving the right document. In embodiments, however, most of the queries are very short. N-gram indexing is also used in phonetic-based search engines used to retrieve sound and speech.

In FIG. 1, without the n-gram indexing, a user searching for "Hilbert," would see an under-estimation of the distribution of the term "Hilbert" in the corpus. With n-gram indexing, the user would see an over-estimation of the distribution of the term "Hilbert" in the corpus. Although bigram indexing is used in the example above, in embodiments, n-gram indexing can be used for any positive number "n."

It is unreasonable to expect the user to craft searches that can overcome this problem, as it is very unlikely that the user will think about using "Hubert" instead of "Hilbert." Thus, it would be desirable if the system could automatically suggest alternatives.

Spelling-checker systems have been designed to do just that. These systems suggest likely alternates to a misspelled word. With alternate words, the query can then be expanded to retrieve more documents, thus potentially improving recall of the system. However, to keep precision high, the suggested terms must be well chosen. Choosing the right suggestion is not a problem if the query terms are simply misspelled by the user, and if the corpus contains the right spellings for the query terms. For example, if a user performs a query using the term "lettice," which is not in the corpus, and if the corpus contains the term "lettuce," a system can choose the suggestion "lettuce" and present it to the user as a suggested query term. Users often have no problem realizing that their query was misspelled, and they can easily pick the right suggestions.

For the ProjectorBox, however, the query terms are likely well spelled, but the corpus is likely to be "noisy" with misrecognized words. For example, if a user performs a query "Hilbert," the ProjectorBox will not retrieve misrecognized instances of Hilbert in the corpus, and not all of the documents containing Hilbert will be retrieved for the user. The ProjectorBox could make suggestions to the user, but many of these suggestions will be nonsense words because they are misrecognized words, such as "iformtion" for "information." It can be very difficult for the user to decide whether or not the suggestions make sense.

FIG. 3 shows example text suggestions as recognized by ProjectorBox OCR software from the example corpus of FIG. 1 for the query term "Hilbert," according to embodiments. The number that appears after the text suggestion is the number of times the term appears in the corpus. If a user performs a query for "Hilbert," suggestions the ProjectorBox might make are shown in FIG. 3. Many nonsense words appear in these suggestions, such as "kimber," "1-filbert," "ilbert," and "dhiibert" in the first two rows. A user can not possibly pick the "correct" suggestions if the text of these suggestions is shown.

FIG. 4 shows example word image versions of some of the FIG. 3 text suggestions, according to embodiments. The ProjectorBox presents these word images to the user as suggestions instead of presenting to the user text suggestions that correspond to correctly recognized and misrecognized words. A word image is basically a portion of OCR data that shows a word in a single slide. The OCR software provides the position of the text word on the slide images so that a cropped region around the text word can be displayed to the user instead of the entire original image and instead of the text word as recognized by the OCR software. For a user presented with the list of word images in FIG. 4, selecting the correct suggestions is arguably much easier than selecting the correct text suggestions of FIG. 3. The user is still overwhelmed with many images, however.

Figure 5:
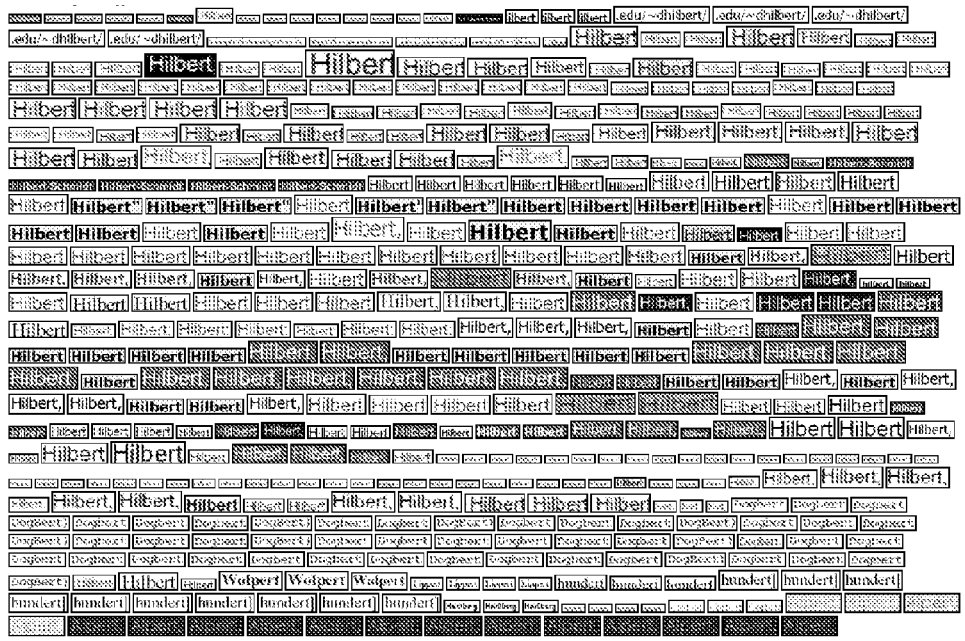
FIG. 5 shows an example larger set of word image versions of the FIG. 3 text suggestions, according to embodiments.

FIG. 5 shows an example larger set of word image versions of the FIG. 3 text suggestions, according to embodiments. FIG. 5 shows that many of the misrecognized text suggestions for "Hilbert" of FIG. 3 can be correctly shown as "Hilbert" word images in FIG. 5. FIG. 5 also shows that others of the suggestions are correctly recognized words other than "Hilbert," such as "Dogbert" and "Alpert" from FIG. 3, that are presented to the user as word image suggestions.

Grouping Word Images

For the "Hilbert" query example, FIG. 5 also shows an example 467 word image suggestions that a user would have to sort through if the word images are not grouped. OCR software can misrecognize a given word in many ways. The number of misspellings also increases with the word length. For example, "information" is misrecognized in more ways than "add." Showing all the word image suggestions for longer words can then be overwhelming for a user, as the software can typically present the user with hundreds of word image suggestions.

The OCR software groups several suggestions under the same image representation, effectively reducing the list of word images that the user needs to browse. To find the similarity between word images, grouping is performed using several similarity measures.

Figure 6:
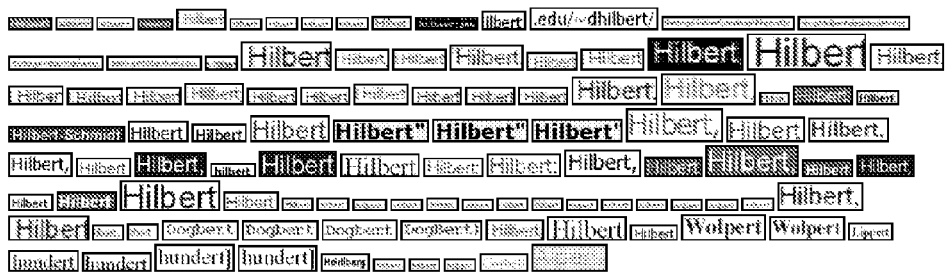
FIG. 6 shows example resulting word image suggestions after grouping the FIG. 5 word image suggestions by location, according to embodiments.

FIG. 6 shows example resulting word image suggestions after grouping the FIG. 5 word image suggestions by location, according to embodiments. After grouping word image suggestions by location, the number of images the user has to review is greatly reduced, from 467 in FIG. 5 to 107 in FIG. 6. This first similarity measure is based on position of the word image within a slide. Two word images are similar if their strings are recognized by the OCR software as identical and their bounding box positions overlap on their respective slides by more than a given threshold. The bounding box is the box around the word image, or the cropped region of the slide image that includes the text word. The bounding box position is defined by (x,y) coordinates of the center of the word image within the slide image, in addition to the height and width of the word image. In embodiments, eighty percent is the given threshold, but this percentage can be any percentage.

Figure 7:
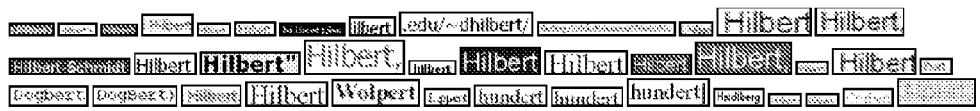
FIG. 7 shows example resulting word image suggestions after grouping the FIG. 6 word image suggestions by textual context, according to embodiments.

FIG. 7 shows example resulting word image suggestions after grouping the FIG. 6 word image suggestions by textual context, according to embodiments. This second similarity measure reduces the number of word image suggestions from the example 107 in FIG. 6 to the example 39 in FIG. 7. This second similarity measure is based on the textual similarity of the word images in the context of their respective slides. For example, because "David Hilbert" and "David Hilbert" share the same left context "David," the grouping of the corresponding two word images "Hilbert" is performed. In another example, because "Don Hilbert is" and "David Hilbert does" do not share either left or right contexts, the grouping of the corresponding two word images "Hilbert" is not performed.

Figure 8:
FIG. 8 shows example resulting word image suggestions after grouping the FIG. 7 word image suggestions by image similarity, according to embodiments.

FIG. 8 shows example resulting word image suggestions after grouping the FIG. 7 word image suggestions by image similarity, according to embodiments. This third similarity measure reduces the number of word image suggestions from the example 39 in FIG. 7 to the example 33 in FIG. 8. Current techniques can be used to perform image similarity. For example, in embodiments, two images are considered similar if their total pixel-by-pixel difference is less than some threshold. In another example, in embodiments, two images are considered similar if the number of pixels differing between the images is less than some proportion of the total pixels. In embodiments, a pixel is considered to differ between two images if the mean square difference between the pixels exceeds some threshold. In embodiments, for performance reasons, word images and their similarities can be pre-computed for frequent words or frequently queried words.

In other embodiments, the list of word image suggestions can further by reduced if grouping is allowed across misrecognized words. In this case, grouping using the textual context works best. For example, suppose a misrecognized word is "txt" instead of "text." Suppose "txt" appears in "the txt is good" in a first slide and also appears in "the txt is good" in a second slide. The word image for "txt" is shown for only one of the two slides, not both of them. The assumption is that these two "txt" terms are very likely to be the same terms because they were surrounded by the same context ("the" . . . "is good") in both slides. Thus, if the user chooses to correct the word image, the user only need to correct one of the two word images because only one of the word images is shown to the user.

Scaling, Reducing, Sorting, and Ranking Word Image Suggestions

Figure 9A:
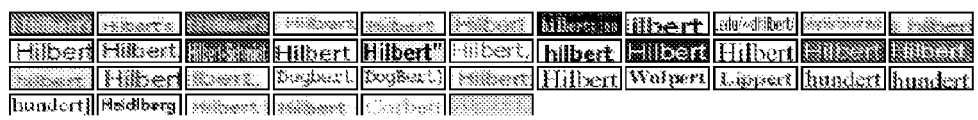
FIGS. 9A and 9B show example resulting word image suggestions after scaling the FIG. 7 word image suggestions, according to embodiments.
Figure 9B:
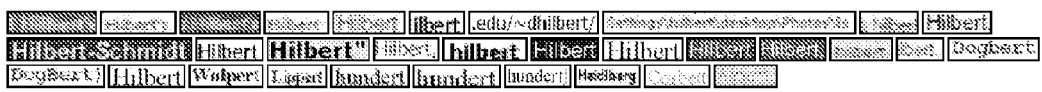

FIGS. 9A and 9B show example resulting word image suggestions after scaling the FIG. 7 word image suggestions, according to embodiments. Before presenting the word images to the user, the word images are first scaled to the same size, allowing faster skimming by the user of the word images. In FIG. 9A, the boxes from FIG. 7 have been scaled to the same width and height. The boxes from FIG. 8 could have been used in FIG. 9A instead, but for illustrative purposes, the boxes from FIG. 7 were used in this example. In FIG. 9B, the boxes from FIG. 7 have been scaled to the same height only. For illustrative purposes, however, only a representative selection of the boxes from FIG. 7 is shown in FIG. 9B.

Figure 10:
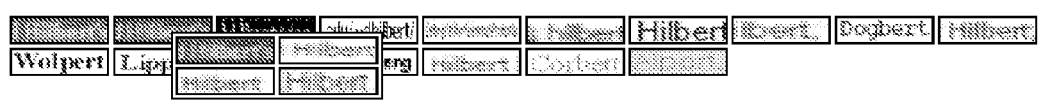
FIG. 10 shows an example reduced number of resulting word image suggestions after choosing a representative word image suggestion for each distinct suggestion of FIG. 9A, according to embodiments.

FIG. 10 shows an example reduced number of resulting word image suggestions after choosing a representative word image suggestion for each distinct suggestion of FIG. 9A, according to embodiments. The 39 images of FIG. 9A correspond to 17 different suggestions, as shown in FIG. 10. By picking one image word for each suggestion, we can further reduce the number of images shown to the user. In embodiments, the user interface allows users to see the actual list of images inside each group and expand the group if needed. The grouping of images can be imperfect, which is a good reason for the popup window. In FIG. 10, for example, the grouping of images was imperfect, as can be seen in the popup window, showing different suggestions "Hilbert's" and ":Hilbert." Visualizing the group can be done using a popup window upon the user moving the mouse over the group representative. Visualizing the group can also be implemented by linking the mouse position to images in the group. If a user clicks on a group, the images inside each group are expanded into the flat list, or layout, at the mouse position, in a similar manner as adding words to a sentence using a word processor.

In embodiments, word images can be sorted using different criteria, then displayed to the user in a particular order based on the sorting. In embodiments, the sorting criteria can be based on the number of slides that map to a specific word image, as users are probably more interested in suggestions that have the highest impact on recall. In embodiments, the sorting criteria can be based on the size of the image words on the actual slide/document. Users might be less interested about suggestions for tiny word images, as they might be less important in the context of the slides than larger word images.

In embodiments, the system ranks the suggestions and displays the number of slides or documents that contain a particular suggestion. A word image suggestion that will result in retrieving a hundred more images, for example, if the user selects it has more "impact" on the system than a word image suggestion that will result in retrieving only one additional image, for example. Because the user's task is to quickly improve recall of the system by selecting suggestions, it is useful to indicate to the user what effect on recall a particular suggestion will have. The ranking of the suggestions allows the user to determine the most important suggestions in terms of their direct effect on recall because the rank numbers show the number of slides or documents that will be added to the query results after the user chooses a particular suggestion. The sorting of suggestions also helps the user determine the most important suggestions.

User Interface

The user interface of the ProjectorBox software allows users such as students to interface with the ProjectorBox through the Interne on their home computers or laptops. Through the user interface, users can query the system for their instructors' slides, select word image suggestions, and retrieve a resulting group of their instructors' slides, as discussed above. A user can click on a word image suggestion to select it and can click again on a word image suggest to deselect it.

Figure 11:
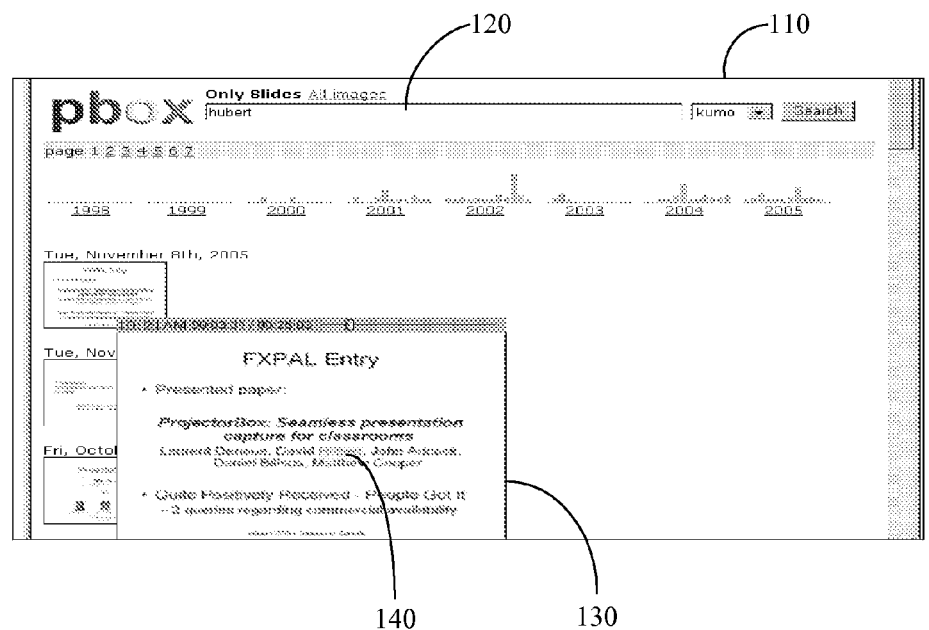
FIG. 11 shows an example screenshot of the ProjectorBox user interface that allows users to exclude misrecognized terms from a query result list, according to embodiments.

FIG. 11 shows an example screenshot of the ProjectorBox user interface that allows users to exclude misrecognized terms from a query result list, according to embodiments. The users can also include correctly recognized terms from the query result list using the ProjectorBox user interface. When a user interacts with the ProjectorBox user interface 110, there are cases where the user wants to exclude slides from the results of a query. For example, the user performs a query using the search term "Hubert" in the query text field 120 of the ProjectorBox user interface 110. If the query returns to the user some slide images containing "Hilbert," such as image 130, the user quickly sees that the slide is about "Hilbert," not "Hubert." The user can choose to exclude these misrecognized images from their results. The user can exclude this term from the result list by clicking directly on the highlighted part of the image thumbnail "Hilbert" 140.

Figure 12:
FIG. 12 shows how an example "rubber band" tool selects a subset of example word image suggestions, according to embodiments.

FIG. 12 shows how an example "rubber band" tool selects a subset of example word image suggestions, according to embodiments. A user can select images for a result set of word image suggestions by clicking on them or by dragging a "rubber band" to select more than one image, as shown by the dotted box selecting the first five word image suggestions of FIG. 12. Query results selected by the user are added to the result set. Alternatively, "accept" and "reject" buttons or checkboxes are associated with suggestion images to allow both adding and excluding of suggestion result images.

In embodiments, the system can keep track of users' selected suggestions. Information regarding query terms, associated user-excluded word image suggestions, and associated user-included word image suggestions can be saved to the system. In embodiments, the system can automatically correct the text based on these selected suggestions. For the "Hilbert" query term example, for all instances of "Hilbert" that the system misrecognizes as "Hubert," if a user selects a "Hilbert" suggestion that corresponds to text "Hubert," the system can replace misrecognized text "Hubert" with "Hilbert." Suggestions selected by users can be used to re-rank the list of suggestions. Over time, the quality of the corpus increases, and users spend less time selecting suggestions.

Queries with Multiple Terms

FIG. 13 illustrates an example table showing for multiple query terms the slides in which they were found, according to embodiments. When a user's query contains multiple terms, the suggestion technique is applied to each term. Because the default behavior in ProjectorBox is to perform an AND of query terms, suggestions are eliminated that do not co-occur with the suggestions of all other terms, where suggestions include the original spellings of the query terms.

For example, if the query is "information retrieval," the ProjectorBox returns suggestions for variations of "information" and for variations of "retrieval." FIG. 13 shows that original query term "information" appears, or occurs, on slide number 7. Suggestion "nformation" appears on slide numbers 1, 2, and 5. Suggestion "foriiation" appears on slides 4 and 6. Similarly, original query term "retrieval" appears on slide number 1. Suggestion "retrlval" appears on slides 2, 4, and 8, and suggestion "retrival" appears on slides 3 and 7.

FIG. 14 illustrates an example table showing for the multiple query terms of FIG. 13, which slides are eliminated from query results, according to embodiments. Only the candidates from slides that match a suggestion for each term are kept. In this example, slide numbers 3, 5, 6, and 8 match a suggestion for only one of the original query terms. Slide numbers 3 and 8 do not match a suggestion for "information," as shown in column 2. Slide numbers 5 and 6 do not match a suggestion for "retrieval," as shown in column 3. Thus, slides 3, 5, 6, and 8 are eliminated from the query results. As shown in the fourth column, slide numbers 1, 2, 4, and 7 are presented to the user as the results of the user's query for "information retrieval."

System Hardware, Software, and Components

Although the above solution was designed to improve retrieval for the OCR data captured by the ProjectorBox system, the solution can also be applied to other scanned document types. Further, the solution can also be applied to data captured by other systems other than the ProjectorBox system.

Figure 15:
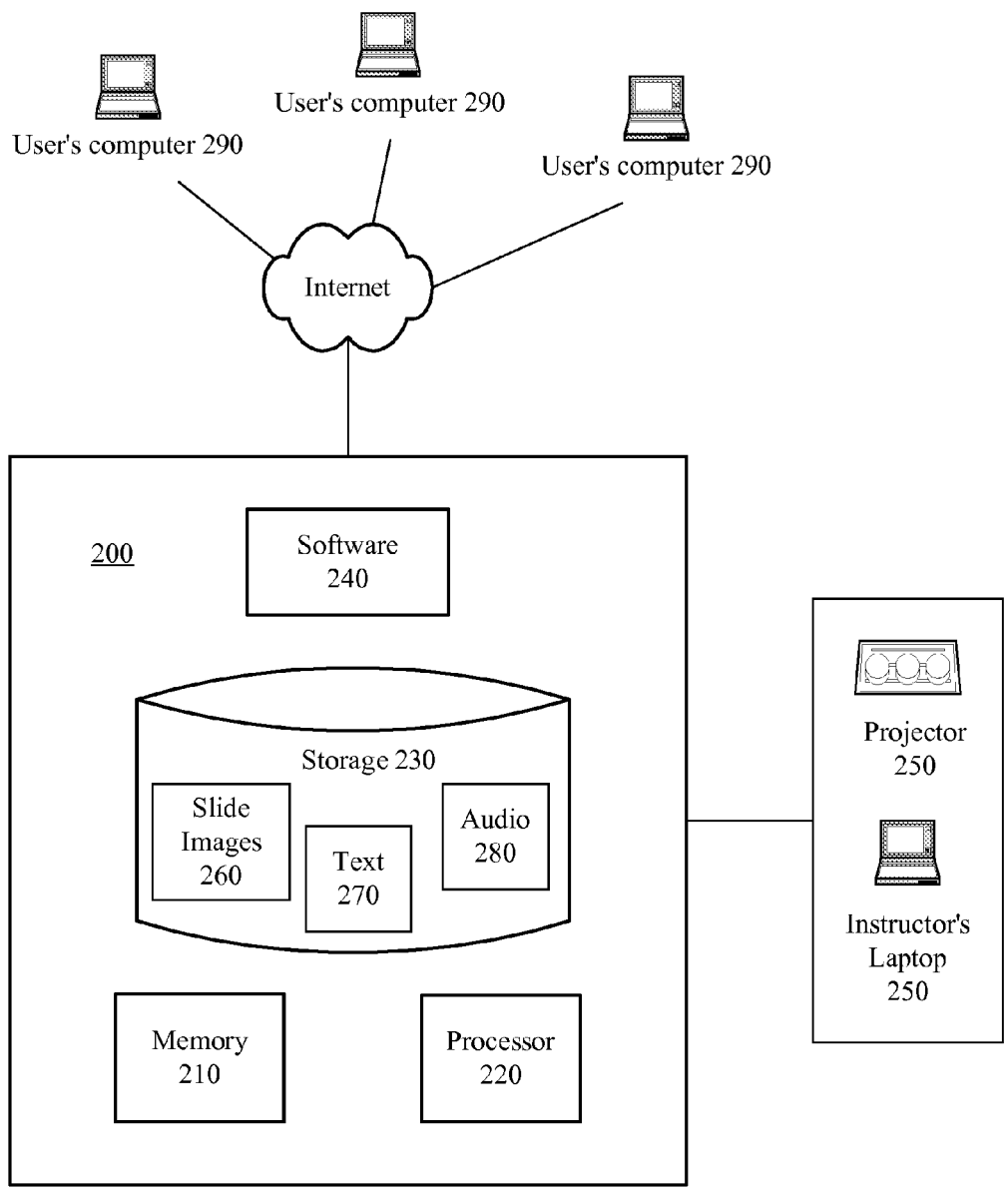
FIG. 15 shows an example ProjectorBox system, according to embodiments.

FIG. 15 shows an example ProjectorBox system, according to embodiments. The system 200 typically includes one or more memories 210, one or more processors 220, and one or more storage devices or repositories 230 of some sort. The system 200 further includes software 240 that automatically captures multimedia from an instructor's laptop or from a projector 250, for example. The system 200 stores multimedia slide images 260, text 270, and audio 280 in the storage devices 230. Software 240 also indexes and manages presentation multimedia. Further, software 240 includes a web-based user interface with which student users can interact from their home computers or laptops 290 through the Internet to query the system for their instructors' slides, select word image suggestions, and retrieve a resulting group of their instructors' slides.

Embodiments of the present invention can include computer-based methods and systems which can be implemented using a conventional general purpose or a specialized digital computer(s) or microprocessor(s), programmed according to the teachings of the present disclosure. Appropriate software coding can readily be prepared by programmers based on the teachings of the present disclosure. Embodiments of the present invention can include a program of instructions executable by a computer to perform any of the features presented herein.

Embodiments of the present invention can include a computer readable medium, such as a computer readable storage medium. The computer readable storage medium can have stored instructions which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, flash memory or any media or device suitable for storing instructions and/or data. The present invention can include software for controlling both the hardware of a computer, such as a general purpose/specialized computer(s) or microprocessor(s), and for enabling them to interact with a human user or other mechanism utilizing the results of the present invention. Such software may include, but is not limited to, device drivers, operating systems, execution environments/containers, user interfaces, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. It is to be understood that other embodiments of the invention can be developed and fall within the spirit and scope of the invention and claims. The embodiments were chosen and described in order to best explain the principles of the invention and its practical application, thereby enabling others of ordinary skill in the relevant arts to understand the invention for various embodiments and with various modifications that are suited to the particular use contemplated. It is intended that the scope of the invention be defined by the following claims and their equivalents.

What is claimed is:

1. An interactive system for increasing retrieval performance of images depicting text by allowing users to provide relevance feedback on words contained in the images, the system comprising:

a processor;
one or more persistent storage devices, wherein at least one persistent storage device is coupled to the processor for storing a program of instructions, wherein the program of instructions are executed by the processor to perform a function to implement the system, the function comprising the steps of:
receiving a query input comprising one or more query terms from a user through the user interface to locate one or more images included in the one or more persistent storage devices;
determining one or more text suggestions related to the one or more query terms, wherein the one or more text suggestions comprise terms that have been identified as being included in the one or more images;
retrieving one or more word images from the one or more images related to the one or more text suggestions, wherein each word image is a graphical rendering of a portion of the one or more images that shows a word;
creating one or more word image groups from the retrieved word images using one or more similarity measures;
wherein the one or more similarity measures includes a location similarity measure, wherein two word images are similar when their bounding box positions within their different corresponding images overlap by more than a given threshold;
determining at least one representative word image for each word image group;
displaying the representative word image for each word image group to the user via the user interface; and
receiving a selection of one or more of the displayed representative word images from the user via the user interface.

2. The system of claim 1, further comprising exclusion by the user of one or more word images to increase precision of image retrieval results for the one or more query terms.

3. The system of claim 1, further comprising n-gram indexing of text converted from the one or more images prior to the user query of the system, an n-gram comprising a string of characters of length n, wherein n comprises any positive integer.

4. The system of claim 1, wherein the one or more similarity measures comprise a textual context similarity measure.

5. The system of claim 1, wherein the one or more similarity measures comprise an image similarity measure, wherein two word images are similar if their total pixel-by-pixel difference is less than some threshold.

6. The system of claim 1, wherein the representative word images for each word image group comprise scaled versions of the representative word images to one uniform size for display to the user.

7. The system of claim 1, further comprising a ranking of each representative word image by a display to the user of the number of the one or more images in which the one or more word images contained in the one or more word image groups associated with each representative word image can be found.

8. The system of claim 1, wherein the query contains two or more terms, wherein the one or more word images are not retrieved from the one or more images when the one or more images that do not contain all terms in the query as identified by the system.

9. The system of claim 1, wherein information regarding query terms, associated user-excluded word image suggestions and associated user-included word image suggestions are saved to the system.

10. A method for increasing retrieval performance of images depicting text by allowing users to provide relevance feedback on words contained in the images, the method comprising:
receiving a query input comprising one or more query terms from a user through a user interface to locate one or more images included in a system;
determining one or more text suggestions related to the one or more query terms, wherein the one or more text suggestions comprise terms that have been identified as being included in the one or more images;
retrieving one or more word images from the one or more images related to the one or more text suggestions, wherein each word image is a graphical rendering of a portion of the one or more images that shows a word;
creating one or more word image groups from the retrieved word images using one or more similarity measures;
wherein the one or more similarity measures includes a location similarity measure, wherein two word images are similar when their bounding box positions within their different corresponding images overlap by more than a given threshold;
determining at least one representative word image for each word image group;
displaying the representative word image for each word image group to the user via the user interface; and
receiving a selection of one or more of the displayed representative word images from the user via the user interface.

11. The method of claim 10, further comprising excluding by the user of one or more word images to increase precision of image retrieval results for the one or more query terms.

12. The method of claim 10, further comprising n-gram indexing of text converted from the one or more images prior to the user query of the system, an n-gram comprising a string of characters of length n, wherein n comprises any positive integer.

13. The method of claim 10, wherein the one or more similarity measures comprise a textual context similarity measure.

14. The method of claim 10, wherein the one or more similarity measures comprise an image similarity measure, wherein two word images are similar if their total pixel-by-pixel difference is less than some threshold.

15. The method of claim 10, wherein displaying the representative word image for each word image group by the user interface comprises scaling each representative word image to one uniform size.

16. The method of claim 10, further comprising ranking each representative word image by displaying to the user the number of the one or more images in which the one or more word images contained in the one or more word image groups associated with each representative word image can be found.

17. The method of claim 10, wherein the query contains two or more terms, wherein the one or more word images are not retrieved from the one or more images when the one or more images that do not contain all terms in the query as identified by the system.

18. The method of claim 10, further comprising saving information regarding query terms, associated user-excluded word image suggestions, and associated user-included word image suggestions to the system.

19. A program of instructions stored in a non-transitory computer readable medium executable by a computer to perform a function for increasing retrieval performance of images depicting text by allowing users to provide relevance feedback on words contained in the images, the function comprising the steps of: receiving a query input comprising one or more query terms from a user through a user interface to locate one or more images included in a system; determining one or more text suggestions related to the one or more query terms, wherein the one or more text suggestions comprise terms that have been identified as being included in the one or more images; retrieving one or more word images from the one or more images related to the one or more text suggestions, wherein each word image is a graphical rendering of a portion of the one or more
images that shows a word; creating one or more word image groups from the retrieved word images using one or more similarity measures; wherein the one or more similarity measures includes a location similarity measure, wherein two word images are similar when their bounding box positions within their different corresponding images overlap by more than a given threshold; determining at least one representative word image for each word image group; displaying the representative word image for each word image group to the user via the user interface; and receiving a selection of one or more of the displayed representative word images from the user via the user interface.

20. The system of claim 1, wherein the terms that have been identified as being included in the one or more images comprise correctly recognized and misrecognized words.

21. The method of claim 10, wherein the terms that have been identified as being included in the one or more images comprise correctly recognized and misrecognized words.

22. The system of claim 1, wherein there are multiple word image groups and wherein the representative word image for each of the multiple word image groups are displayed on the same screen at the same time via the user interface.

23. The method of claim 10, wherein there are multiple word image groups and wherein the representative word image for each of the multiple word image groups are displayed on the same screen at the same time via the user interface.

24. The system of claim 1, wherein the representative word image shows only the word without any surrounding context.

25. The method of claim 10, wherein the representative word image shows only the word without any surrounding context.

26. The system of claim 1, wherein the images are slides.

* * * * *